2,758,121

ENOL ACETATES FROM 20-KETOSTEROIDS

Gustav Ehrhart, Josef Schmidt-Thomé, Heinrich Ruschig, Werner Fritsch, and Werner Haede, Frankfurt am Main, Germany, assignors to Farbwerke Hoechst Aktiengesellschaft vormals Meister Lucius und Bruning, Frankfurt am Main-Hochst, Germany, a German company No Drawing. Application October 20, 1952, Serial No. 315,846

Claims priority, application Germany October 22, 1951

8 Claims. (Cl. 260—397.5)

The present invention relates to the preparation of enol acetates from 20-ketosteroids, by heating under reflux 20-ketosteroids, in the presence of a sulfonic acid as a catalyst, in a mixture of isopropenyl acetate and solvents of a high boiling point; during said treatment further acylizable groups which may be present are likewise acetylated.

According to Gallagher et al. ("Journal of the American Chemical Society," vol. 70, page 1837 (1948)), 20-ketosteroids may be transformed into $\Delta^{17,20}$-enol acetates by boiling them for a prolonged time with acetic anhydride used in a very large excess in the presence of para-toluenesulfonic acid, while continuously distilling the glacial acetic acid formed during the reaction.

In U. S. Patent No. 2,595,596, is described, a method by which 20-ketosteroids may be transformed with hydrogen as sole substituent attached to carbon atoms 17 and 20 of the sterol skeleton into the corresponding $\Delta^{20(21)}$-enol acetates by boiling said 20-ketosteroids in a reflux apparatus with isopropenyl acetate in the presence of catalytic amounts of a sulfonic acid and continuously removing by distillation the acetone formed during the reaction.

T. F. Gallagher et al. ("Journal of the American Chemical Society," vol. 74, page 2810 (1952)) likewise describe the preparation of $\Delta^{20(21)}$-enol acetates from 20-ketosteroids by heating the 20-ketones in a reflux apparatus with isopropenyl acetate in the presence of sulfuric acid or para-toluenesulfonic acid. In this case, too, the acetone formed must be removed by partially distilling the solvent.

Now we have found that 17,20-unsaturated 20-enol acetates as well as 20,21-unsaturated 20-enol acetates may be obtained by heating under reflux 20-ketosteroids in a mixture of isopropenyl acetate and solvents of a high boiling point in the presence of a sulfonic acid as a catalyst. As solvents of a high boiling point there may be used acetic anhydride, furthermore toluene, xylene, anisole and other neutral solvents of a high boiling point. The mixing ratio between isopropenyl acetate and high-boiling solvent is about 1:0.5 to about 1:10, preferably 1:1 to 1:2. As suitable catalysts there may be named the acids, such as para-toluenesulfonic acid, sulfuric acid, amidosulfonic acid and others. As steroids there may be used: 20-ketopregnanes, 20-keto-allo-pregnanes, 20-ketopregnenes, 20-keto-allo-pregnenes, 20-ketopregnadienes and 20-ketopregnatrienes.

In general, on using a mixture of isopropenyl acetate and acetic anhydride, 17,20-unsaturated 20-enol acetates are obtained as main products in the form of a mixture of the cis-trans-isomers; small quantities of 20,21-unsaturated enol acetates may sometimes also be formed. By means of mixtures of isopropenyl acetate and solvents, such as toluene, xylene or anisole, there are obtained in some cases, for example with $\Delta^5$-pregnene-3 beta-ol-20-one, the 20,21-unsaturated 20-enol acetates as main product; in this case, too, a small quantity of 17,20-unsaturated enol acetate may be formed. In other cases, for example when progesterone is applied, 17,20-unsaturated 20-enol acetate is formed as the main product, and as a by-product a small quantity of 20,21-unsaturated enol acetate may be obtained.

It depends on the temperature of the mixture and on the total constitution of the 20-ketosteroid to be applied, and could not clearly be foretold whether, on using isopropenyl acetate in mixture with the last-named solvents, 20,21-unsaturated enol acetate or 17,20-unsaturated enol acetate is preferably formed. Since the melting points and optical rotations of 20,21-unsaturated 20-enol acetates and the corresponding 17,20-unsaturated 20-enol acetates are sometimes very similar, it cannot be derived therefrom which of the enol acetates is formed. A clear characterization is, however, enabled by the infra-red absorption spectrum. All the 20,21-unsaturated 20-enol acetates show a strong band around $6.02\mu$ and a further band specific for the C=CH$_2$ group around $11.46\mu$. Both bands are not present when 17,20-unsaturated enol acetates are concerned.

In comparison with the hitherto applied process, the new method of operating shows various advantages. Compared with the method of preparing 17,20-unsaturated enol acetates described by Gallagher (J. Amer. Chem. Soc., vol. 70, page 1837 (1948)), only about one-tenth or even less of the quantity of acetic anhydride is required; the continuous distillation of the glacial acetic acid formed by Gallagher's method is no longer necessary, since, if glacial acetic acid is produced at all, it is transformed into acetic anhydride owing to the presence of isopropenyl acetate the reaction period is shorter and less colored by-products are formed. In comparison with the preparation of 20,21-unsaturated enol acetates according to the process described in U. S. patent specification No. 2,595,596 and by Gallagher et al. (J. Amer. Chem. Soc., vol. 74, page 2810 (1952)), a simplification results by the omission of the continuous distillation of the acetone formed during the reaction. According to the present invention, sensitive substances may also be transformed into 20-enol acetates. For example, under the conditions described by Gallagher, progesterone can by no means be transformed with acetic anhydride, in the presence of para-toluenesulfonic acid, into di-enol-di-acetate, because an extensive resinification takes place. According to the process of U. S. specification No. 2,595,596 only the 20,21-unsaturated progesterone-di-enol di-acetate has become accessible. According to the present process, however, the hitherto unknown 17,20-unsaturated progesterone-di-enol di-acetate may also be prepared.

The following examples serve to illustrate the invention, but they are not intended to limit it thereto:

Example 1

A mixture of 500 milligrams of pregnenolone, 350 milligrams of para-toluenesulfonic acid monohydrate, 5 cc. of isopropenyl acetate and 5 cc. of xylene is heated to boiling for 6 hours under reflux. The reaction mixture is then poured into water, stirred for some time so that the isopropenyl acetate present in excess can decompose, extracted with ether, the ether solution is washed with dilute sodium hydroxide solution and water, dried with sodium sulfate and the ether is distilled. After recrystallization is complete, the residue yields 470 milligrams of pregnenolone enol di-acetate which shows an optical rotation $[\alpha]_D^{20} = -40°$. By a repeated recrystallization from methanol, there is obtained the pure 3-beta 20-diacetoxy-$\Delta^{5,20}$-pregnadiene melting at 123° C. and showing an optical rotation of $[\alpha]_D^{20} = -46°$.

Example 2

A mixture of 350 milligrams of pregnenolone, 240 milligrams of para-toluenesulfonic acid monohydrate, 3.5 cc. of isopropenyl acetate, and 3.5 cc. of anisole is boiled for 3 hours under reflux. The mixture is then worked up in the manner described in Example 1 and yields 330 milligrams of 3 beta, 20-diacetoxy $\Delta^{5,20}$-pregnadiene showing an optical rotation of $[alpha]_D^{20}=-46°$.

Example 3

A mixture of 500 milligrams of pregnenolone, 280 milligrams of amidosulfonic acid, 5 cc. of isopropenyl acetate and 5 cc. of anisole is boiled for 3 hours. The mixture is worked up as described in Example 1 and there are obtained 430 milligrams of a crude product and, after repeated recrystallization from methanol, 3 beta, 20-diacetoxy-$\Delta^{5,20}$-pregnadiene in the pure form.

Example 4

A mixture of 500 milligrams of pregnenolone, 350 milligrams of para-toluene sulfonic acid monohydrate, 5 cc. of isopropenyl acetate and 10 cc. of acetic anhydride is boiled for 3 hours under reflux. The reaction mixture is then poured into water, stirred for some time so that the isopropenyl acetate present in excess can decompose, extracted with ether, the ether solution is washed with dilute sodium hydroxide solution and water, dried with sodium sulfate and the ether is distilled. 510 milligrams of 3.20-diacetoxy-$\Delta^{5,17(20)}$-pregnadiene are obtained which, by recrystallization from methanol, can be obtained in a completely pure form.

Example 5

A mixture of 10 grams of pregnenolone, 5 grams of para-toluenesulfonic acid monohydrate, 100 cc. of isopropenyl acetate and 100 cc. of acetic anhydride is boiled for 5 hours under reflux. The mixture is then poured into 1 liter of ice water, stirred for 2 hours and the reaction product which has separated is filtered. It is dissolved in methylene chloride, the solution is washed with sodium carbonate solution and then dried and the solvent is distilled. After recrystallization from methanol, the residue yields 9.93 grams of the mixture of cis-trans-isomers of the $\Delta^{17(20)}$-unsaturated pregnenolone enol di-acetate (3.20-diacetoxy-$\Delta^{5,17(20)}$-pregnadiene) showing an optical rotation of $[alpha]_D^{20}=-45°$. From the cis-trans-mixture the two isomers may be isolated in the pure form, according to Fieser and Huang-Minlon (J. Amer. Chem. Soc., vol. 71, page 1840 (1949)).

Example 6

A mixture of 500 milligrams of allo-pregnanolone, 350 milligrams of para-toluenesulfonic acid monohydrate, 5 cc. of isopropenyl acetate and 5 cc. of anisole is boiled for 4 hours under reflux. The mixture is worked up as described in Example 1, the residue is dissolved in benzene, the solution is caused to pass through a column of aluminum oxide, the benzene solution is caused to dry and the allo-pregnanoloneenol di-acetate which remains is recrystallized from methanol. The yield amounts to 400 milligrams; the product shows an optical rotation of $[alpha]_D^{20}=+16°$. It consists of the mixture of cis-trans-isomers of the 3 beta,20-di-acetoxy-$\Delta^{17(20)}$-allo-pregnene.

Example 7

A mixture of 9 grams of allo-pregnanolone, 4.5 grams of para-toluenesulfonic acid monohydrate, 70 cc. of acetic anhydride and 45 cc. of isopropenyl acetate is vigorously boiled for 6 hours under reflux. The brown solution is poured into ice water and stirred for 2 hours. The reaction product which has separated is filtered, washed with water and dissolved in methylene chloride. The solution is shaken out with sodium carbonate solution, dried with sodium carbonate and filtered over charcoal and the methylene chloride is distilled.

The residue is dissolved in benzene, the solution is caused to pass through a column of aluminum oxide in order to purify it, and subsequently washed with benzene. After evaporation and a subsequent recrystallization from methanol there are obtained from the benzene solution 8 grams of allopregnanolone enol di-acetate melting between 94° C. and 102° C. and showing an optical rotation of $[alpha]_D^{20}=+16°$. It constitutes a mixture of the cis- and trans-form of the 3 beta,20-di-acetoxy-$\Delta^{17(20)}$-allo-pregnene from which the two pure isomers may be obtained according to Gallagher et al. (J. Amer. Chem. Soc., vol. 70, page 1837 (1948)).

Example 8

A mixture of 730 milligrams of progesterone, 400 milligrams of para-toluenesulfonic acid monohydrate, 5 cc. of isopropenyl acetate and 5 cc. of xylene is boiled for 6 hours under reflux. After the usual working up there are obtained 250 milligrams of $\Delta^{17(20)}$-unsaturated progesterone di-enol-di-acetate (3.20-di-acetoxy-$\Delta^{3,5,17(20)}$-pregnatriene) melting between 141° C. and 144° C. and showing an optical rotation of $[alpha]_D^{20}=-130°$.

Example 9

A mixture of 3.65 grams of progesterone, 2 grams of para-toluenesulfonic acid monohydrate, 30 cc. of isopropenyl acetate and 30 cc. of acetic anhydride is boiled for 2 hours under reflux. The mixture is then stirred into 500 cc. of ice water and worked up in the usual manner. The crude product obtained is treated with charcoal and then recrystallized from methanol. There are obtained 3.38 grams of $\Delta^{17(20)}$-unsaturated progesterone-di-enol di-acetate (3,20-diacetoxy-$\Delta^{3,5,17(20)}$-pregnatriene) melting between 141° C. and 144° C. and showing an optical rotation of $[alpha]_D^{20}=-130°$.

Example 10

A mixture of 0.5 gram of progesterone, 0.285 gram of para-toluenesulfonic acid monohydrate, 5 cc. of anisole and 5 cc. of isopropenyl acetate is gently boiled for 3 hours. Ether is added to the reaction mixture which is then washed with dilute sodium bi-carbonate solution and water; the ether solution is then dried over sodium sulfate. The ether is then distilled under reduced pressure and the oily residue is recrystallized twice from methanol. There are obtained 310 milligrams of $\Delta^{17(20)}$-unsaturated progesterone-di-enol-di-acetate (3,20-diacetoxy-$\Delta^{3,5,17(20)}$-pregnatriene) melting at 141° C. and showing an optical rotation of $[alpha]_D^{20}=-135°$.

From the mother liquor a small portion of the 20,21-unsaturated progesterone-di-enol-di-acetate (3,20-diacetoxy-$\Delta^{3,5,20}$-pregnatriene) may be isolated, melting between 84° C. and 87° C. and showing an optical rotation of $[alpha]_D^{20}=-120°$.

Example 11

5 grams of $\Delta^5$-pregnene-3 beta-ol-20-one are heated to boiling for 3 hours in a mixture of 50 cc. of pyridine and 5 grams of benzoic anhydride. The reaction solution is poured into water and the precipitate which has separated in the form of flakes is filtered. After recrystallization from butyl acetate, there are obtained 5.3 grams of $\Delta^5$-pregnene-3 beta-ol-20-one-benzoate melting at 194° C.

500 milligrams of $\Delta^5$-pregnene-3 beta-ol-20-one-benzoate are heated to boiling for 1 hour in a mixture of 5 cc. of isopropenyl acetate, 5 cc. of acetic anhydride and 350 milligrams of para-toluene sulfonic acid monohydrate. The reaction mixture is then poured into water, stirred for some time and the product which has precipitated is filtered. After the recrystallization from butyl acetate, there are obtained 510 milligrams of the crude product which after further recrystallization from butyl acetate, yields pure 3 beta-benzoyloxy-20-acetoxy-$\Delta^{5,17(20)}$-pregnadiene melting at 242° C.

The same compound is obtained by using a mixture of isopropenyl acetate and anisole in a ratio of 1:1. In this case a small quantity of the 20,21-unsaturated enol acetate is formed as a by-product.

Example 12

3.96 grams of allo-pregnane-3 beta-ol-20-one-acetate are heated to boiling for 6 hours in a mixture of 17.5 cc. of isopropenyl acetate, 35 cc. of acetic anhydride and 2.5 grams of para-toluenesulfonic acid. After the usual working up there are obtained 3.25 grams of 3 beta,20-diacetoxy-$\Delta^{17(20)}$-allo-pregnene in the form of a mixture of the cis- and trans-isomers.

We claim:

1. In the process of preparing 20-enol acetates by acylation of a 20-ketosteroid selected from the group consisting of 20-ketopregnanes, 20-keto-allo-pregnanes and 20-ketopregnenes, in the presence of a catalyst, the improvement which comprises employing as the acylation medium a mixture of isopropenyl acetate and a solvent selected from the group consisting of toluene, xylene, anisole and acetic anhydride in a ratio of 1:0.5–1:10.

2. In the process of preparing 20-enol acetates by acylation of a 20-ketosteroid selected from the group consisting of 20-ketopregnanes, 20-keto-allo-pregnanes and 20-ketopregnenes, in the presence of a sulfonic acid as catalyst, the improvement which comprises employing as the acylation medium a mixture of isopropenyl acetate and a solvent selected from the group consisting of toluene, xylene, anisole and acetic anhydride in a ratio of 1:0.5–1:2.

3. In the process of preparing 20-enol acetates from 20-ketosteroids by acylation in the presence of a sulfonic acid as catalyst, the improvement which comprises employing as the acylation medium a mixture of isopropenyl acetate and acetic anhydride in a ratio of 1:0.5–1:2.

4. A process of preparing 3 beta-20-diacetoxy-$\Delta^{5,20}$-pregnadiene which comprises heating under reflux $\Delta^5$-pregnene-3 beta-ol-20-one in the presence of a catalytic amount of para-toluenesulfonic acid, in a mixture of isopropenyl acetate and anisole in a ratio of 1:1.

5. A process of preparing 3 beta-20-diacetoxy-$\Delta^{5,17(20)}$-pregnadiene which comprises heating under reflux $\Delta^5$-pregnene-3 beta-ol-20-one, in the presence of a catalytic amount of para-toluenesulfonic acid, in a mixture of isopropenyl acetate and acetic anhydride in a ratio of 1:2.

6. A process of preparing 3 beta-20-diacetoxy-$\Delta^{17(20)}$-allo-pregnene which comprises heating under reflux allo-pregnane-3 beta-ol-20-one, in the presence of a catalytic amount of para-toluenesulfonic acid, in a mixture of isopropenyl acetate and acetic anhydride in a ratio of 1:2.

7. A process of preparing 3,20-diacetoxy-$\Delta^{3,5,17(20)}$-pregnatriene which comprises heating under reflux progesterone, in the presence of a catalytic amount of para-toluenesulfonic acid, in a mixture of isopropenyl acetate and acetic anhydride in a ratio of 1:1.

8. A process of preparing 3 beta-benzoyloxy-20-acetoxy-$\Delta^{5,17(20)}$-pregnadiene which comprises heating under reflux pregnenolone benzoate, in the presence of a catalytic amount of para-toluenesulfonic acid, in a mixture of isopropenyl acetate and acetic anhydride in a ratio of 1:1.

References Cited in the file of this patent
UNITED STATES PATENTS

| | | |
|---|---|---|
| 2,577,777 | Levin | Dec. 11, 1951 |
| 2,595,596 | Moffett | May 6, 1952 |
| 2,668,817 | Magerlein | Feb. 9, 1954 |